United States Patent
Harer et al.

(10) Patent No.: US 9,498,895 B2
(45) Date of Patent: Nov. 22, 2016

(54) HANDHELD WORK APPARATUS

(71) Applicant: Andreas Stihl AG & Co. KG, Waiblingen (DE)

(72) Inventors: Matthias Harer, Waiblingen (DE); Erik Andresen, Waiblingen (DE); Ralf Blechschmidt, Kernen (DE); Philipp Neumann, Stuttgart (DE); Friedrich Hollmeier, Rudersberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 46 days.

(21) Appl. No.: 14/663,074

(22) Filed: Mar. 19, 2015

(65) Prior Publication Data

US 2015/0273721 A1 Oct. 1, 2015

(30) Foreign Application Priority Data

Mar. 27, 2014 (DE) .................. 10 2014 004 526

(51) Int. Cl.
| B27B 17/02 | (2006.01) |
| B23D 59/00 | (2006.01) |
| B25F 5/02 | (2006.01) |
| B23D 57/02 | (2006.01) |

(52) U.S. Cl.
CPC ............ B27B 17/02 (2013.01); B23D 57/023 (2013.01); B23D 59/006 (2013.01); B25F 5/021 (2013.01)

(58) Field of Classification Search
CPC ..... B27B 17/02; B25F 5/021; B23D 57/023; B23D 59/006
USPC .................................. 30/381–387
See application file for complete search history.

(56) References Cited

U.S. PATENT DOCUMENTS

| 3,793,727 | A | * | 2/1974 | Moore | ................. B27B 17/083 192/130 |
| 4,117,594 | A | * | 10/1978 | Arbuckle | ................. B27B 17/02 30/381 |
| 4,654,971 | A | * | 4/1987 | Fettes | ................. A01G 3/08 30/296.1 |
| 4,694,578 | A | * | 9/1987 | Kemmler | ................. B25F 5/006 123/195 R |
| 5,345,686 | A | * | 9/1994 | Zimmermann | ......... B27B 17/14 30/383 |
| 6,112,419 | A | * | 9/2000 | Uhl | ................. A01G 3/08 30/381 |
| D636,450 | S | * | 4/2011 | Wu | ................. B27B 17/02 D21/694 |
| 8,595,943 | B2 | * | 12/2013 | Buttery | ................. B27B 17/14 30/381 |
| 2001/0010122 | A1 | * | 8/2001 | Taomo | ................. B27B 17/0033 30/383 |
| 2002/0073551 | A1 | * | 6/2002 | Goodwin | ........... F01M 11/0408 30/123.4 |
| 2002/0124421 | A1 | * | 9/2002 | Hermes | ................. B27B 17/14 30/386 |
| 2002/0166243 | A1 | * | 11/2002 | Galster | ................. B27B 17/02 30/382 |

(Continued)

FOREIGN PATENT DOCUMENTS

DE 20 2011 051 060 U1 11/2011

*Primary Examiner* — Sean Michalski

(74) *Attorney, Agent, or Firm* — Walter Ottesen, P.A.

(57) ABSTRACT

A handheld work apparatus has a housing with a guide bar affixed thereto. A saw chain is driven along the guide bar which defines a central plane. A drive element for the chain is in a sprocket wheel space delimited by a sprocket wheel cover. The cover has a longitudinal edge which delimits the space adjacent to a first side of the saw chain. The longitudinal edge has a length from an entry region to a discharge opening. Over at least 50% of this length, the longitudinal edge is at a distance (L) to the housing. The distance (L) corresponds to the chain width (a). The distance of the longitudinal edge of the cover increases at the discharge opening in the running direction of the first side. The largest distance (b) of the longitudinal edge to the central plane is at least 110% of the smallest distance (c).

19 Claims, 6 Drawing Sheets

(56) References Cited

U.S. PATENT DOCUMENTS

| | | | | |
|---|---|---|---|---|
| 2004/0098869 | A1* | 5/2004 | Ashfield | B27B 17/02 30/383 |
| 2006/0196058 | A1* | 9/2006 | Warfel | B27B 17/14 30/381 |
| 2008/0034597 | A1* | 2/2008 | Pfleiderer | B27B 17/02 30/382 |
| 2008/0184568 | A1* | 8/2008 | Gieske | B27B 17/0008 30/383 |
| 2009/0325751 | A1* | 12/2009 | Carstensen | B62J 13/04 474/145 |
| 2011/0072671 | A1* | 3/2011 | Tsuruoka | B27B 17/00 30/383 |
| 2011/0232110 | A1* | 9/2011 | Wolf | B27B 17/02 30/383 |
| 2013/0091715 | A1* | 4/2013 | Zimmermann | B28D 1/082 30/382 |
| 2013/0318802 | A1* | 12/2013 | Kapinsky | B23D 59/006 30/383 |
| 2013/0319392 | A1* | 12/2013 | Tholking | B27B 17/02 125/21 |
| 2014/0047723 | A1* | 2/2014 | Vidale Wade | B27B 17/0083 30/383 |
| 2014/0215838 | A1* | 8/2014 | Bergquist | B27B 17/0008 30/383 |
| 2014/0345149 | A1* | 11/2014 | Etou | B23D 57/023 30/383 |
| 2015/0290830 | A1* | 10/2015 | Zieger | B27B 17/02 30/383 |
| 2015/0321376 | A1* | 11/2015 | Engelfried | B23D 59/001 30/383 |
| 2015/0375416 | A1* | 12/2015 | Haneda | B27B 17/00 30/383 |
| 2016/0052158 | A1* | 2/2016 | Luedtke | B27B 17/02 30/383 |
| 2016/0107326 | A1* | 4/2016 | Zimmermann | F16N 21/00 30/383 |

* cited by examiner

HANDHELD WORK APPARATUS

CROSS REFERENCE TO RELATED APPLICATION

This application claims priority of German patent application no. 10 2014 004 526.9, filed Mar. 27, 2014, the entire content of which is incorporated herein by reference.

BACKGROUND OF THE INVENTION

United States patent application publication 2013/0318802 discloses a chain saw which has a sprocket wheel cover. The lower longitudinal border of the sprocket wheel cover is spaced apart from the housing, and therefore the sprocket wheel space below the first side of the chain is open to the surroundings. As a result, chips can drop downward out of the sprocket wheel space.

SUMMARY OF THE INVENTION

It is an object of the invention to provide a handheld work apparatus of the type in question, which permits good chip removal.

The portable handheld work apparatus of the invention includes: a housing; a guide bar defining a longitudinal center axis and being mounted on the housing; a saw chain arranged on the guide bar so as to revolve therearound in a running direction; a drive motor; a drive element defining a rotational axis and being arranged between the drive motor and the saw chain; the drive motor being configured to drive the saw chain in the running direction via the drive element; the guide bar further defining an imaginary center plane containing the longitudinal center axis and extending perpendicularly to the rotational axis of the drive element; the saw chain having a chain width (a) measured perpendicularly to the imaginary center plane; the guide bar having a free end remote from the housing and having a redirect region at the free end; the saw chain having a first side running from the redirect region to the drive element and a second side running in the running direction from the drive element to the redirect region; a sprocket wheel cover delimiting a sprocket wheel space accommodating the drive element therein; the sprocket wheel space being configured to provide an entry region to permit the saw chain to pass into the sprocket wheel space and being configured to provide a discharge opening for cut matter; the sprocket wheel cover having a longitudinal edge delimiting the sprocket wheel space next to the first side of the saw chain; the longitudinal edge extending over a predetermined length from the entry region to the discharge opening; the longitudinal edge being at a distance (L) to the housing over at least 50% of the predetermined length with the distance (L) being measured perpendicularly to the imaginary center plane; the distance (L) corresponding at least to the saw chain width (a); the longitudinal edge of the sprocket wheel cover having a section at the discharge opening wherein the longitudinal edge runs inclined to the imaginary center plane of the guide bar and whereat the discharge opening widens in the running direction of the first side of the saw chain; the longitudinal edge having a first location lying at a largest distance (b) to the imaginary center plane and a second location lying at a smallest distance (c) to the imaginary center plane; and, the largest distance (b) to the imaginary center plane being at least 110% greater than the smallest distance (c) to the imaginary center plane.

It has been shown that the chip removal from the sprocket wheel space can be significantly improved if the longitudinal border of the sprocket wheel cover is at an increased distance from the central plane of the guide bar in the region of the discharge opening. It is provided that the longitudinal border of the sprocket wheel cover has, at the discharge opening, a section in which the longitudinal border runs in an inclined manner with respect to the central plane of the guide bar, wherein the discharge opening widens in the running direction of the first side of the saw at the section running in an inclined manner with respect to the central plane of the guide bar. This assists the removal of the chips and reduces the clogging tendency. The greatest distance of the longitudinal border from the central plane is at least 110% of the smallest distance here.

It has been shown that even very wide discharge openings are expedient. In order not to excessively increase the overall width of the work apparatus, it is advantageously provided that the largest distance is at most 500% of the smallest distance. The smallest distance of the longitudinal border from the central plane is advantageously at most 1.5 times the chain width. An advantageous configuration of the longitudinal border is produced if a first region of the longitudinal border runs parallel to the central plane of the guide bar and the discharge opening is bounded by a second region of the longitudinal border, which region runs at least partially in an inclined manner with respect to the central plane. The discharge opening length measured in the central plane is advantageously at least 3 times, in particular at least 5 times, the chain width. As a result, chips can exit in a substantially unobstructed manner through the discharge opening into the surroundings. The longitudinal border particularly advantageously runs in an arc at the discharge opening. The longitudinal border is advantageously at its largest distance from the central plane here at a distance from the wall which bounds the discharge opening on the side located facing away from the entry region. The distance from the wall bounding the discharge opening is advantageously at least half the chain width here.

In order to permit good chip removal, it is advantageously provided that the discharge opening is bounded by a wall of a guide part on the side located facing away from the entry region, wherein the wall encloses, with the longitudinal center axis of the guide bar, an angle which opens toward the discharge opening and is advantageously at least 110°. The angle is particularly advantageously at least 120°. It has been shown that particularly good chip removal is achieved if the sprocket wheel cover also opens laterally with respect to the running direction of the chain at the discharge opening. For this purpose, it is advantageously provided that, in a section plane perpendicular to the central plane and to the longitudinal center axis of the guide bar, the inner wall of the sprocket wheel cover encloses, with the central plane, an angle which is from approximately 2° to approximately 45° and which opens in the direction away from the sprocket wheel space at the discharge opening. The angle is particularly advantageously approximately 2° to approximately 10°. In a top view of the plane of the guide bar, the longitudinal border advantageously encloses, with the longitudinal center axis of the guide bar, an angle which opens counter to the running direction of the first side and which is advantageously at least 3°, at the discharge opening. The angle is in particular at least 10°. The angle should preferably be selected here to be as large as possible.

The work apparatus advantageously has at least one fastening element, which is arranged on the outer side of the sprocket wheel cover, for fixing the sprocket wheel cover to the housing of the work apparatus. The fastening element is advantageously arranged in a recess of the sprocket wheel cover, which recess is bounded by an upper longitudinal rib and a lower longitudinal rib. The outer sides of the longitudinal ribs advantageously here form a support surface of the sprocket wheel cover. When the work apparatus rests with the sprocket wheel cover, for example, on a trunk or the like, catching on the fastening elements can thereby be substantially avoided. The work apparatus can thus be readily guided in operation.

In order to avoid chips from accumulating in the sprocket wheel cover in the region of the second side of the saw chain, it is advantageously provided that the sprocket wheel cover has, adjacent to the second side of the saw chain, an upper peripheral wall which is adjoined by a sprocket wheel cover surface, wherein the sprocket wheel cover surface is at a distance of less than twice the chain width from the central plane. It has been shown that a comparatively small distance of the sprocket wheel cover surface from the central plane makes it substantially possible to avoid chips from being drawn into the region between sprocket wheel cover surface and the saw chain. The sprocket wheel cover surface here is advantageously oriented approximately parallel to the central plane or is inclined slightly with respect thereto while the upper peripheral wall runs transversely, in particular approximately perpendicularly, to the central plane. On the second side of the saw chain, the sprocket wheel space is advantageously embodied as a channel which extends between the saw chain and the upper peripheral wall and which is at least partially bounded by the sprocket wheel cover surface in the direction perpendicular to the central plane. In a section plane which contains the rotational axis of the drive element and is perpendicular to the longitudinal center axis of the guide bar, the distance of the outer side of the sprocket wheel cover surface from the central plane is advantageously smaller than the distance of the outer side of the support surface from the central plane. The sprocket wheel cover surface is accordingly offset in relation to the support surface toward the housing of the work apparatus. As a result, the work apparatus can be guided very close to a work piece or along the ground, whereupon cuts are possible very close to a boundary. As a result of the fact that the sprocket wheel cover surface is offset in relation to the support surface toward the housing of the work apparatus, a comparatively compact and slender constructional form of the work apparatus is produced.

In a section plane which contains the longitudinal axis of a fastening element and is perpendicular to the central plane, the distance of the outer side of the support surface from the central plane is at least 1.3 times the distance of the outer side of the sprocket wheel cover surface from the central plane. A comparatively large offset between support surface and central plane is thereby achieved. In the entire region between the front side, which faces the free end of the guide bar, and the section plane, which contains the rotational axis of the drive element and is perpendicular to the longitudinal center axis of the guide bar, the sprocket wheel cover surface is preferably significantly smaller than the distance of the outer side of the support surface from the central plane. The distance of the outer side of the support surface over the entire region is preferably at least 1.3 times the distance of the outer side of the sprocket wheel cover surface from the central plane. The support surface preferably merges into the sprocket wheel cover surface on the rear region of the sprocket wheel cover, which rear region faces away from the front side of the sprocket wheel cover, wherein the transition preferably takes place in a rounded manner. As a result, it is avoided that the operator can catch in this region on a work piece by an edge between support surface and sprocket wheel cover surface.

The sprocket wheel cover preferably has at least one fastening opening for a clawed stop, wherein the bearing surface, which surrounds the fastening opening, for the clawed stop is at a distance of at most twice the chain width from the central plane of the guide bar. The distance is in particular less than 1.8 times the chain width. As a result of the fact that the bearing surface for the clawed stop is offset in relation to the support surface toward the housing of the work apparatus, a small overall height is produced in this region. Fastening elements for the clawed stop can be configured in such a manner that they do not project beyond the support surface, and therefore the operator is not disturbed by the fastening elements when working.

The longitudinal ribs are preferably connected to one another via a connecting region in a region of the sprocket wheel cover which covers the drive element. In the region of the drive element, the sprocket wheel cover is thus at a sufficiently large distance from the drive element. At the same time, improved support of the sprocket wheel cover is produced. Hooking onto a work piece on the mutually facing longitudinal sides of the longitudinal ribs is substantially prevented. In a section plane which contains the rotational axis of the drive element and is perpendicular to the longitudinal center axis of the guide bar, the distance of the outer side of the connecting region from the central plane is preferably at least 1.3 times the distance of the outer side of the sprocket wheel cover surface from the central plane in this section plane. The connecting region preferably merges substantially flush into the longitudinal ribs and has at most a small offset from the outer side of the longitudinal ribs.

On that longitudinal side of the lower longitudinal rib which faces the longitudinal border, the sprocket wheel cover advantageously has an edge which rises out of the support surface. The operator can support the work apparatus on the work piece at the edge. If the work apparatus is a chain saw, the edge can support the chain saw in relation to the trunk when lopping off branches. This gives rise to a simple ergonomic operation. Owing to the fact that the edge is arranged on the longitudinal rib and not on the sprocket wheel cover surface, the edge protrudes beyond the outer contour of the sprocket wheel cover. As a result, slipping off of the work apparatus is substantially avoided. The edge advantageously has an approximately wedge-shaped cross section. This produces a simple construction and a good support action. Good support is achieved in particular if the outer side of the edge encloses, with the support surface, an angle of approximately 100° to approximately 178°. In order to achieve a good support action, it is advantageously provided that the height of the edge, as measured perpendicularly to the support surface, is approximately 1 mm to approximately 5 mm. The height of the edge is measured here as far as the support surface.

In order to achieve sufficient stability with a low weight of the sprocket wheel cover, it is provided that the sprocket wheel cover has a thickening with an approximately wedge-shaped cross section on the longitudinal border. The thickening ensures sufficient stability of the sprocket wheel cover on the longitudinal border. The sprocket wheel cover can be formed with a smaller material thickness overall in the surface, thus producing a low weight of the sprocket wheel cover.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
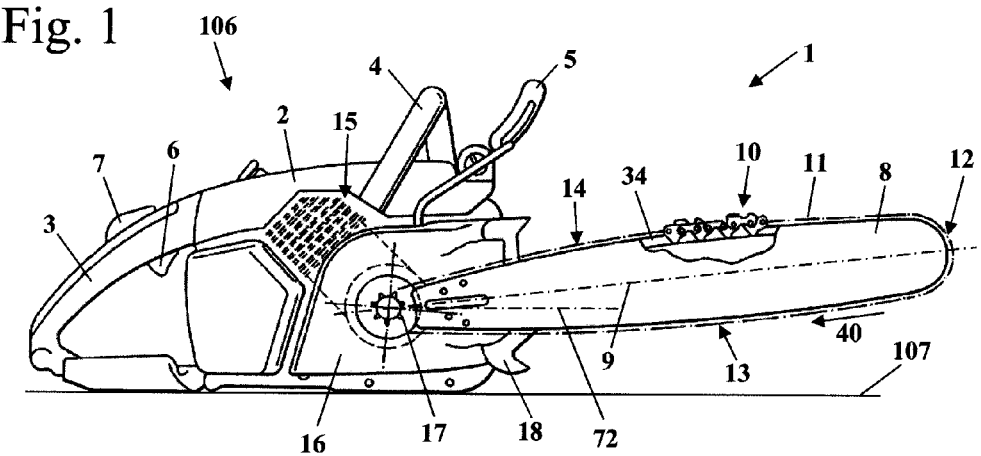
FIG. 1 shows a schematic side view of a chain saw.

FIG. 1 schematically shows a chain saw 1 as an embodiment of a handheld work apparatus. The chain saw 1 has a housing 2 on which a back handle 3 and a bail handle 4 for guiding the chain saw 1 in operation are fixed. FIG. 1 shows the chain saw 1 in a rest position 106, in which the chain saw 1 rests on a flat, horizontal rest surface 107. A horizontal 72 which is oriented horizontally in the rest position 106 is also sketched in schematically in FIG. 1.

A guide bar 8, which has a longitudinal center axis 9, is fixed to the housing 2. A saw chain 10 is arranged in a revolving manner on the outer periphery of the guide bar 8, the saw chain being driven in a running direction 40 via a drive element 17. The guide bar 8 has a redirect region 12 located facing away from the housing 2. The saw chain 10 has a first side 13, which moves in the running direction 40 from the redirect region 12 to the drive element 17, and a second side 14, which moves in the opposite direction from the drive element 17 to the redirect region 12. The saw chain 10 has a longitudinal center axis 11 and is guided in a guide groove 34 of the guide bar 8. A first clawed stop 18 is fixed to the housing 2 adjacent to the guide bar 8.

The drive element 17 is driven by a drive motor 15 which is embodied as an internal combustion engine in the embodiment. However, the drive motor 15 can also be an electric motor, preferably an electric motor supplied with power via cables or via batteries. The region of the drive element 17 is covered by a sprocket wheel cover 16 fixed to the housing 2.

In order to operate the drive motor 15, a throttle lever 6 and a throttle lever lock 7 are mounted pivotably on the back handle 3. A hand guard 5, which can be mounted pivotably and can serve for triggering a chain brake, is held on the housing 2 on that side of the bail handle 4 which faces the guide bar 8.

Figure 2:
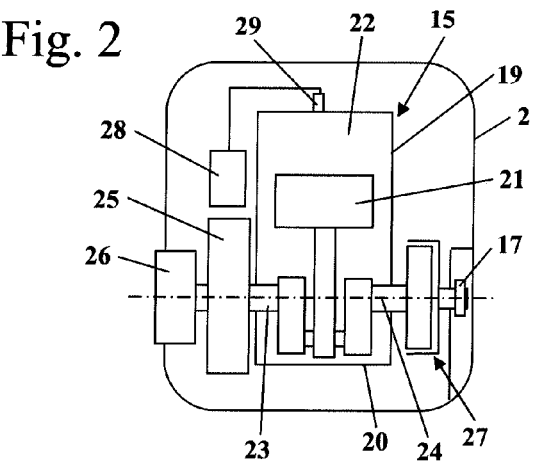
FIG. 2 shows a schematic cross section of a chain saw.

FIG. 2 shows the construction of the drive of the chain saw 1 schematically in detail. The drive motor 15 has a cylinder 19 and a crankcase 20. A piston 21 is mounted in a reciprocating manner in the cylinder 19. The piston 21 and the cylinder 19 conjointly define a combustion chamber 22 into which a spark plug 29 projects. The piston 21 drives, via a connecting rod, a crankshaft 23 so as to rotate about a rotational axis 24. The crankshaft 23 is connected via a centrifugal clutch 27 to the drive element 17 which is likewise driven about the rotational axis 24. On that side of the internal combustion engine 15 which faces away from the drive element 17, a fan wheel 25 is fixed to the crankshaft 23. The fan wheel 25 advantageously serves as a flywheel and generates power in an ignition module 28 arranged on the outer periphery of the fan wheel 25. The ignition module 28 supplies the spark plug 29 with power. A starting device 26 fixed on the crankshaft 23 on that side of the fan wheel 25 which faces away from the drive motor 15 serves for starting the drive motor 15.

Figure 3:
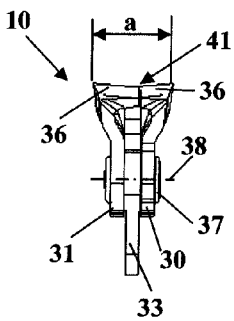
FIG. 3 is a view of a saw chain showing those regions of the cutting teeth which are located facing away from the guide bar.
Figure 4:
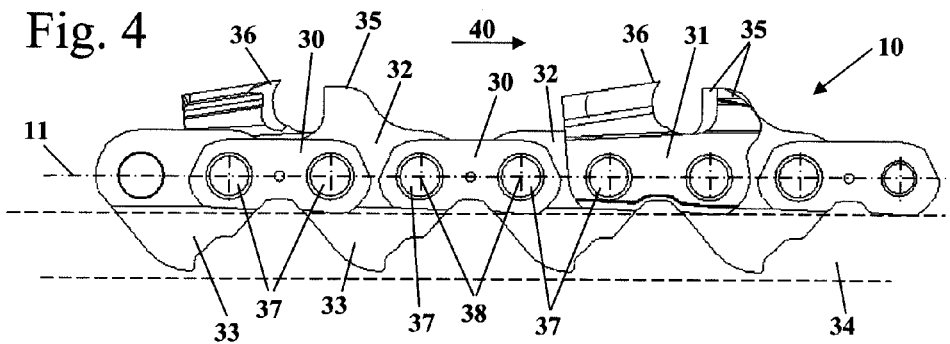
FIG. 4 shows a side view of a segment of the saw chain from FIG. 3.

FIGS. 3 and 4 show an embodiment of a saw chain 10 in detail. The saw chain 10 has lateral connecting links 30 which are connected in an articulated manner to central drive links 32 via connecting rivets 37. The lateral connecting links 30 are partially embodied as cutting links 31. The cutting links 31 have a cutting tooth 36 which serves to remove a chip from the material to be cut, preferably wood. In advance of each cutting tooth 36, depth limiters 35 are arranged on the drive link 32 and on the cutting link 31. Each drive link 32 has a drive projection 33 which dips into the guide groove 34, which is shown schematically in FIG. 4. The drive projections 33 engage in the drive element 17 (FIG. 1), as a result of which the saw chain 10 is driven. The connecting rivets 37 each have a longitudinal center axis 38. The longitudinal center axis 11 runs centrally between adjacent connecting links 30 and intersects the longitudinal center axes 38 of the connecting rivets 37.

As FIG. 3 shows, those regions of the cutting teeth 36, which are located facing away from the guide bar, form a roof 41. The roof 41 is part of the contour which is visible when looking at the saw chain 10 in the direction of the longitudinal center axis 11 of the saw chain 10, and forms the outer contour of the space which the saw chain 10 requires during a movement in the direction of its longitudinal center axis 11. The saw chain 10 has a chain width (a), as measured parallel to the longitudinal center axis 38 of a connecting rivet 37. The chain width (a) is the largest extent of the saw chain 10 perpendicularly to the plane of the guide bar 8.

Figure 5:
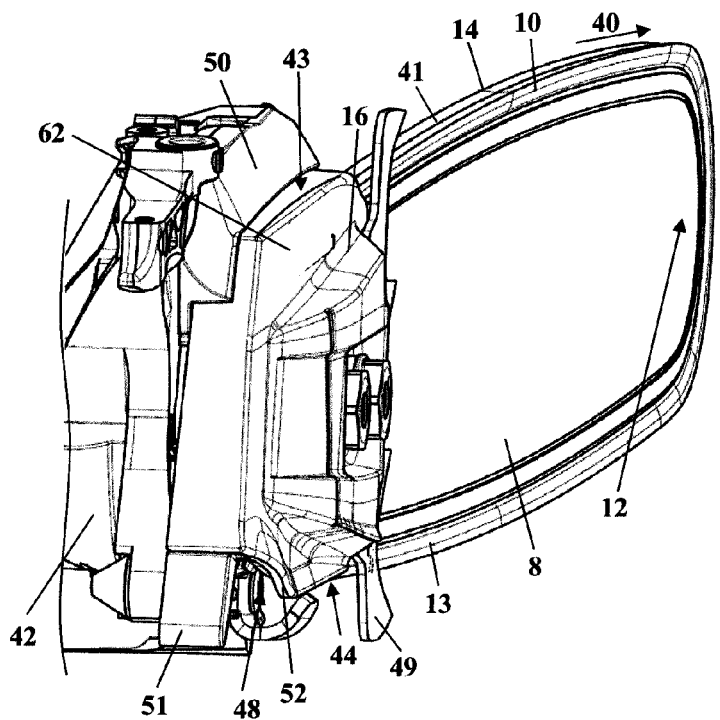
FIGS. 5 and 6 show perspective illustrations of the region of housing and sprocket wheel cover of a chain saw.

As FIG. 5 shows, the sprocket wheel cover 16 has a top side 43 and a bottom side 44. In the rest position 106 shown in FIG. 1, the top side 43 faces upward and the bottom side 44 faces downward. The sprocket wheel cover 16 has a longitudinal border 52 on the bottom side 44. A second clawed stop 49 which is held on the sprocket wheel cover 16 is also visible in FIG. 5. The sprocket wheel cover 16 is fixed to a housing part 42 of the housing 2. A guide part 51 projects out of the sprocket wheel cover 16 adjacent to the bottom side 44 on the side facing away from the redirect region 12 of the guide bar 8. The guide part 51 delimits a discharge opening 48 formed on the sprocket wheel cover 16. The guide part 51 is preferably composed of an elastic material, such as rubber or the like. The sprocket wheel cover 16 has a sprocket wheel cover surface 62. A ramp 50 is arranged on the housing 2 adjacent to the top side 43 of the sprocket wheel cover 16. The ramp partially covers the top side 43 of the sprocket wheel cover 16 and thereby creates a comparatively gentle transition from the housing part 42 to the sprocket wheel cover surface 62.

Figure 6:
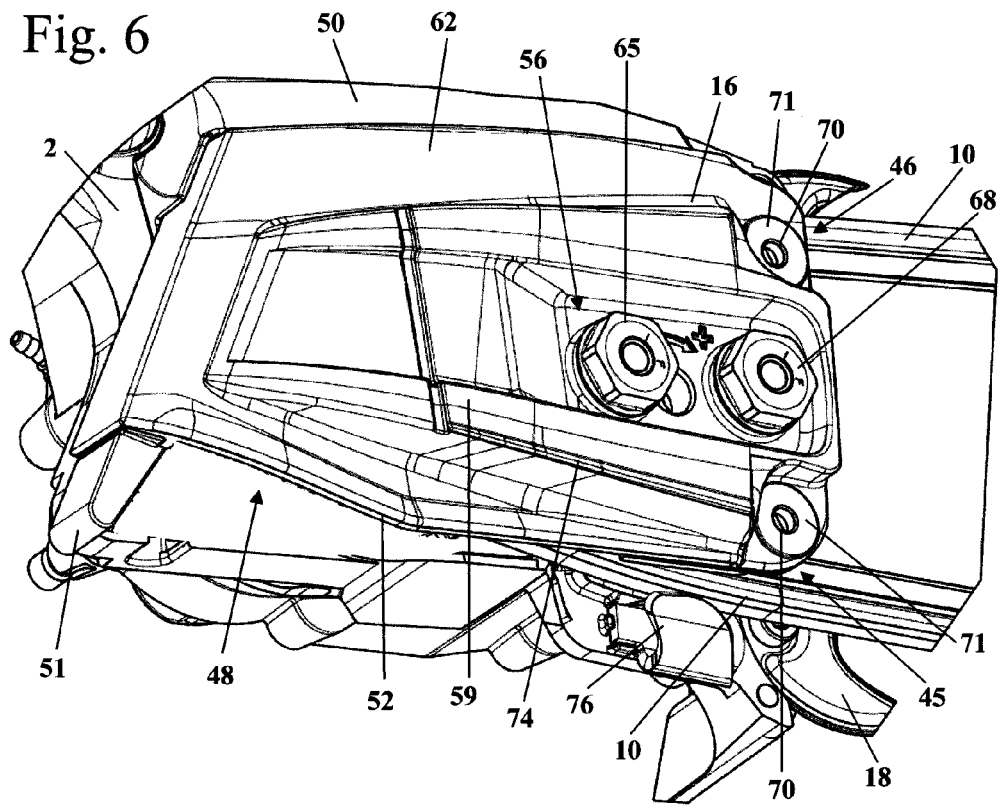

As FIG. 6 shows, the sprocket wheel cover 16 has a support surface 59 which is embodied as an elevation in the sprocket wheel cover 16. The sprocket wheel cover surface 62 is offset in relation to the support surface 59 toward the housing 2 of the chain saw 1. The support surface 59 delimits a recess 56 in which fastening elements, namely fastening nuts 65 and 68, for fixing the sprocket wheel cover 16 to the housing 2 are arranged. The fastening nuts 65 and 68 advantageously do not project, or only project slightly, beyond the support surface 59. On that region of the support surface 59 which faces the longitudinal border 52, an edge 74 is arranged on the sprocket wheel cover 16. During operation, the chain saw 1, for example when lopping off branches, rests with the support surface 59 on a trunk and is pivoted around the trunk by the operator. Owing to the fact that the sprocket wheel cover surface 62 is offset in relation to the support surface 59 toward the housing 2, the longitudinal border 52 does not form a sufficient support for supporting the chain saw 1. Since the edge 74 projects out of the support surface 59, the chain saw 1 can hook onto the work piece, for example onto the trunk, at the edge 74 and, as a result, does not slip off during operation.

Figure 19:
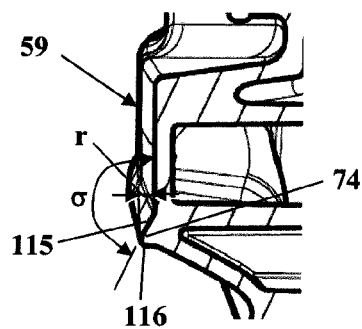
FIG. 19 shows an enlarged view of the region of an edge on the sprocket wheel cover from FIG. 15; and, FIG. 20 shows an enlarged illustration of a clawed stop of the chain saw.

The configuration of the edge 74 is shown in detail in FIG. 19. The edge 74 has a wedge-shaped cross section, wherein a bottom side 116 of the edge 74 runs approximately horizontally. The edge 74 has an outer side 115 which runs downward from the support surface 59 and in a direction away from the sprocket wheel space 47. The outer side 115 encloses, with the support surface 59, an angle σ which is advantageously between 100° and 178°. The angle σ is in particular from approximately 130° to approximately 175°, preferably from approximately 150° to approximately 160°. The edge 74 has a height (r) which is measured perpendicularly to the support surface 59 as far as the support surface 59. The height (r) is advantageously approximately 1 mm to approximately 5 mm.

FIG. 6 shows the sprocket wheel cover 16 without the second clawed stop 49. As FIG. 6 shows, the sprocket wheel cover 16 has two fastening openings 70 which are surrounded by bearing surfaces 71 for fastening elements of the second clawed stop 49. As FIG. 6 shows, the bearing surfaces 71 are only slightly raised, for example by 0.5 mm to 2 mm, from the sprocket wheel cover surface 62. As a result, the fastening elements for the clawed stop 49 can also be arranged substantially flush with the support surface 59 or recessed in relation to the support surface 59.

Figure 9:
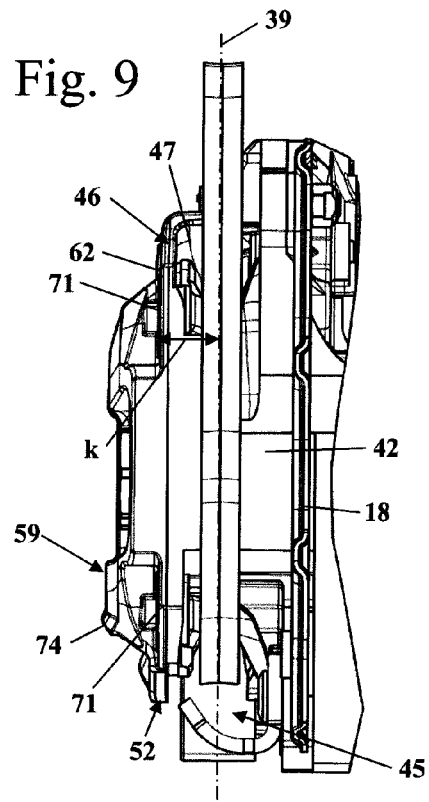
FIG. 9 shows the view from FIG. 8 with clawed stop removed from the sprocket wheel cover.

FIGS. 5 and 6 show the saw chain 10 schematically, specifically through the space region which the saw chain 10 occupies when revolving into the guide bar 8. As FIG. 6 shows, between sprocket wheel cover 16 and the housing 2 there is formed an entry region 45, at which the saw chain 10 enters the region of the sprocket wheel cover 16, and also an exit opening 46, at which the saw chain 10 exits from the sprocket wheel space 47 which is delimited by the sprocket wheel cover 16 (FIG. 9). The entry region 45 extends here as far as the region in which, in a view perpendicularly onto the plane of the guide bar 8, the saw chain 10 is no longer visible. The end 108 of the entry region 45 is shown in FIG. 7 which shows a side view in the direction mentioned.

As FIG. 6 shows, a chain catch 76 is fixed to the housing 2 of the chain saw 1. The chain catch covers the region below the saw chain 10 and projects virtually as far as the longitudinal border 52 of the sprocket wheel cover 16. The chain catch 76 can also be arranged on the sprocket wheel cover 16 and can project toward the housing 2.

Figure 7:
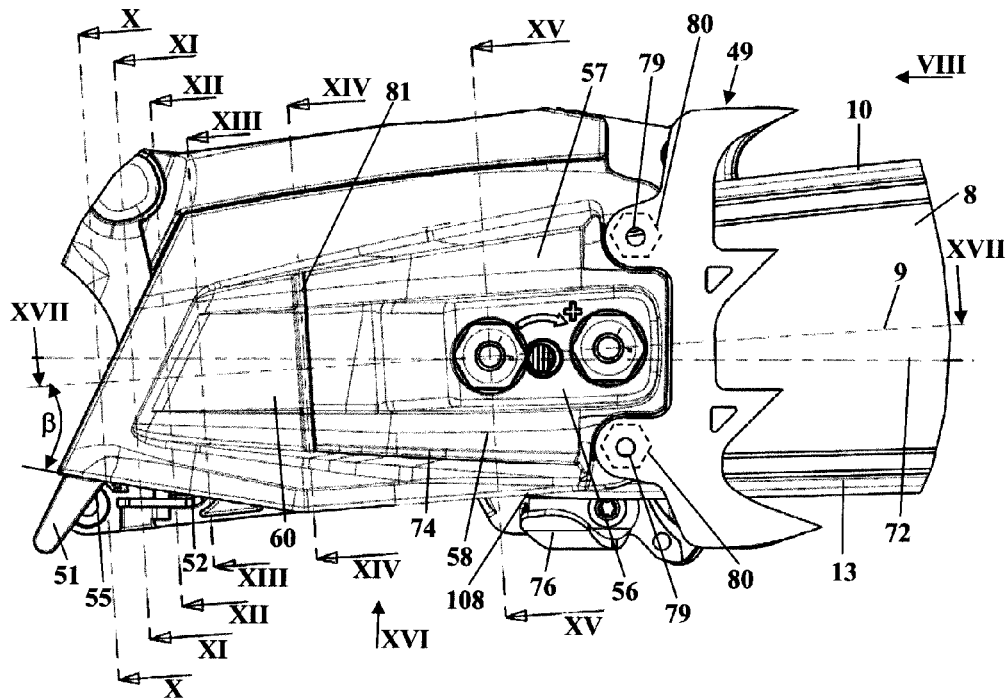
FIG. 7 shows a side view of the sprocket wheel cover arranged on the housing.

As FIG. 7 shows, the recess 56 is bounded by an upper longitudinal rib 57 and a lower longitudinal rib 58. The longitudinal ribs 57 and 58 are connected to each other via a connecting region 60 on the end facing away from the guide bar 8. The longitudinal ribs 57 and 58 together with the connecting region 60 form the support surface 59. A felling strip 81, which is embodied as a recess in the embodiment, extends over the upper longitudinal rib 57, the connecting region 60 and the lower longitudinal rib 58. However, the felling strip 81 can also be embodied as an elevation and, in addition or alternatively, can be contrasting in color. The felling strip 81 permits simple plotting of the felling direction of a tree.

As FIG. 7 shows, in the region bordering the discharge opening 48, the longitudinal border 52 is inclined rearward and upward in the rest position 106 of the chain saw 1. In a viewing direction perpendicular to the plane of the guide bar 8, that is, in plan view of the plane of the guide bar 8, the longitudinal border 52 encloses an angle β with the longitudinal center axis 9 of the guide bar 8. The angle β opens counter to the running direction 40 of the first side 13 of the saw chain 10, that is, in the direction of the redirect region 12 of the guide bar 8 (FIG. 1). The angle β is advantageously at least 3°. The angle β is preferably at least 10°. In order to permit good chip removal, the angle β is preferably selected to be as large as possible.

FIG. 7 also schematically shows fastening screws 80 with which the second clawed stop 49 can be fixed to the sprocket wheel cover 16. Alternatively, screws onto which nuts placed on the outer side of the sprocket wheel cover 16 are screwed can be fixed to the sprocket wheel cover 16. It can also be provided that the screws are arranged on the outer side of the sprocket wheel cover 16 and the nuts on the inner side. A different way of fixing the clawed stop 49 may also be advantageous. As FIG. 7 shows, the guide part 51 has a wall 55 which delimits the discharge opening 48 on the side located at the rear with respect to the running direction 40 of the first side 13.

Figure 8:
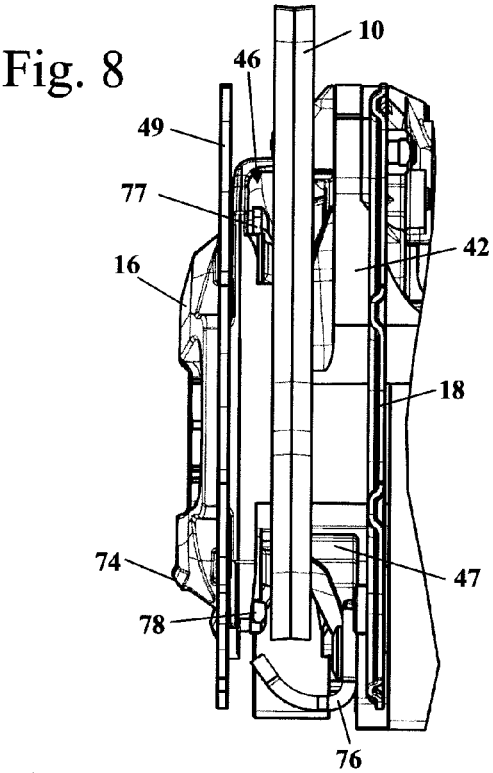
FIG. 8 shows a view from the front in the direction of the arrow VIII-VIII in FIG. 7.

As FIG. 8 shows, the sprocket wheel cover 16 together with the housing part 42 delimits the sprocket wheel space 47 in which the saw chain 10 runs adjacent to the housing 2. FIG. 8 also shows an upper sliding strip 77 and a lower sliding strip 78, which are held on the sprocket wheel cover 16. The sliding strips 77 and 78 are advantageously formed from plastic and are arranged in the vicinity of the entry region 45 and of the exit opening 46 in order to guide the saw chain 10 laterally. FIG. 8 also shows the clawed stops 18 and 49 arranged on both sides of the guide rail 8.

FIG. 9 shows the arrangement from FIG. 8 without the second clawed stop 49. As FIG. 9 shows, the bearing surfaces 71 on which the clawed stop 49 rests are arranged approximately flush in the sprocket wheel cover surface 62. The guide bar 8 has a central plane 39 which is perpendicular to the rotational axis 24 of the drive element 17 and which contains the longitudinal center axis 9 of the guide bar 8. The bearing surface 71 is at a distance (k) which corresponds at most to twice the chain width (a) from the central plane 39. The distance (k) is preferably less than 1.8 times the chain width (a).

Figure 10:
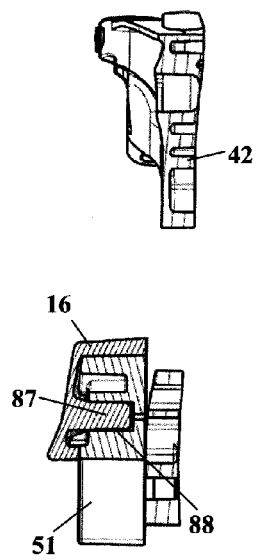
FIG. 10 shows a section along the line X-X in FIG. 7.
Figure 11:
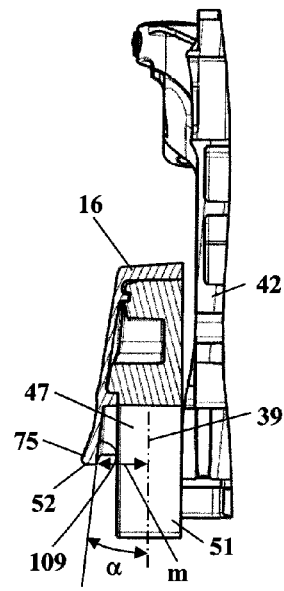
FIG. 11 shows a section along the line XI-XI in FIG. 7.
Figure 12:
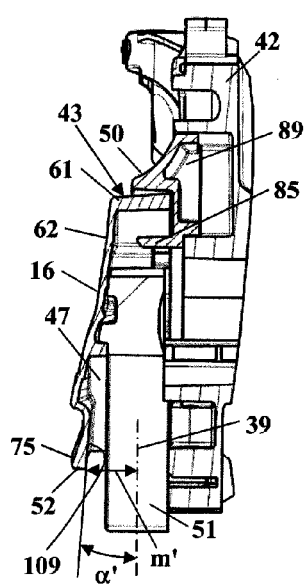
FIG. 12 shows a section along the line XII-XII in FIG. 7.
Figure 13:
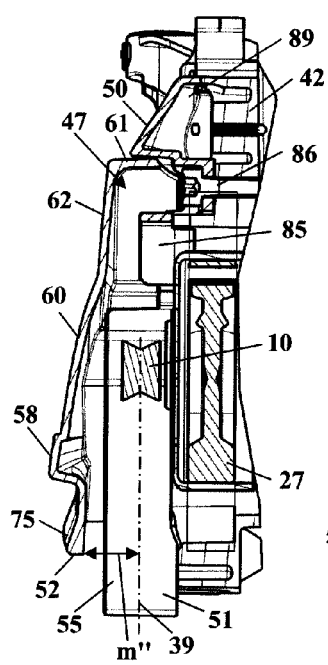
FIG. 13 shows a section along the line XIII-XIII in FIG. 7.

FIGS. 10 to 15 show the sprocket wheel cover 16 on the housing 2 in different section planes running perpendicularly to the longitudinal center axis 9. FIGS. 11, 12 and 13 show sections through the discharge opening 48. As FIG. 10 shows, the guide part 51 is held on the sprocket wheel cover 16 via a lug 87 of the sprocket wheel cover 16, which lug projects into a cutout 88 in the guide part 51.

As FIGS. 11 and 12 show, the inner wall 109 of the sprocket wheel cover 16 is inclined in relation to the central plane 39 adjacent to the longitudinal border 52. In the section plane shown in FIG. 11, the inner wall 109 encloses, with the central plane 39, an angle α which can be from approximately 2° to approximately 45°. The angle α is preferably from approximately 2° to approximately 10°. In the embodiment shown, an angle α of approximately 3° to 5° is provided in the section plane shown. As FIG. 11 shows, the sprocket wheel cover 16 has a thickening 75, which increases in a wedge-shaped manner downward, adjacent to the longitudinal border 52. The stability of the sprocket wheel cover 16 on the longitudinal border 52 is thereby increased. The longitudinal border 52 is at a distance (m), as measured perpendicularly to the central plane 39, from the central plane 39.

In the section plane shown in FIG. 12, the inner wall 109 encloses, with the central plane 39, an angle α' which is somewhat smaller than the angle α in the section plane in FIG. 11. The angle α' is preferably within the same angular ranges which are indicated as being advantageous for the angle α. As FIG. 12 shows, the ramp 50 is formed on a housing component 89 which is fixed to the housing component 42. However, the ramp 50 can also be formed integrally with the housing part 42. The ramp 50 engages over an upper peripheral wall 61 of the sprocket wheel cover 16 and runs on the top side 43 of the sprocket wheel cover 16. The upper peripheral wall 61 delimits the sprocket wheel space 47 upward in the rest position 106 (FIG. 1). As FIG. 12 shows, the upper peripheral wall 61 is inclined with respect to the sprocket wheel cover surface 62, wherein the upper peripheral wall 61 can be arranged approximately perpendicularly to the sprocket wheel cover surface 62. The upper peripheral wall 61 bounds the sprocket wheel space 47 upward in the rest position 106 (FIG. 1). As FIG. 12 also shows, a conducting rib 85, which projects into the sprocket wheel space 47, is molded onto the housing component 89. In this section plane, the longitudinal border 52 is at a distance m' from the central plane 39 that is greater than the distance (m). The section plane shown in FIG. 11 lies further away from the redirect region 12 (FIG. 1) than the section plane shown in FIG. 12.

As FIG. 13 shows, the housing component 89 in the embodiment is fixed to the housing component 42 by a screw 86. The wall 55 is formed on the guide part 51. As FIG. 13 also shows, in the sectional view shown, the connecting region 60 and the lower longitudinal rib 58 rise out of the sprocket wheel cover surface 62. The upper longitudinal rib 57 does not extend into this region. The sprocket wheel cover surface 62 merges gradually into the connecting region 60. In the sectional view which is shown in FIG. 13 and which is located closer to the redirect region 12 (FIG. 1) than the sectional view shown in FIG. 12, the longitudinal border 52 is at a distance m", which is smaller than the distance m' (FIG. 12), from the central plane 39.

Figure 14:
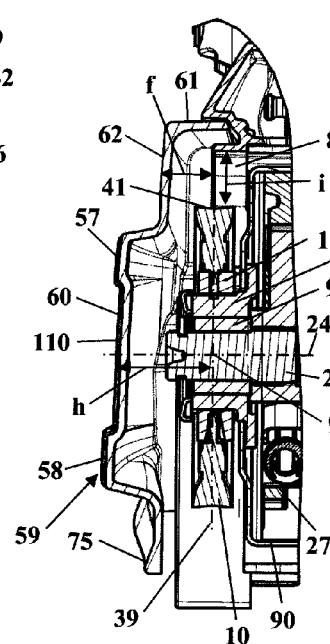
FIG. 14 shows a section along the line XIV-XIV in FIG. 7.

FIG. 14 shows a section perpendicularly to the longitudinal center axis 9 of the guide bar 8 and through the rotational axis 24 of the drive element 17. As FIG. 14 shows, the drive element 17 is embodied as a drive wheel which is mounted in a longitudinally displaceable manner on a lug 91 of a clutch drum 90 of the centrifugal clutch 27. However, the drive part 17 can also be a drive pinion which is fixedly connected to the clutch drum 90. As FIG. 14 shows, the connecting region 60, in the sectional view shown, is at a distance (h) from the central plane 39 on the rotational axis 24. The sprocket wheel cover surface 62 is at a distance (f) from the central plane 39 in the section plane. The distance (h) is advantageously at least 1.3 times the distance (f). The distances (h) and (f) are in each case measured with respect to an outer side 110 of the sprocket wheel cover 16. As FIG. 14 also shows, the roof 41 is at a distance (i) from the conducting rib 85. The conducting rib 85 runs approximately parallel to the roof 41 between the roof 41 and the upper peripheral wall 61. The distance (i) is advantageously as small as possible. It has been shown that the risk of a chip becoming jammed can thereby be significantly reduced since chips which pass into the region between conducting rib 85 and saw chain 10 are rapidly removed from the saw chain 10. FIG. 14 also shows a bearing 92 with which the lug 91 of the clutch drum 90 is mounted on the crankshaft 23.

Figure 15:
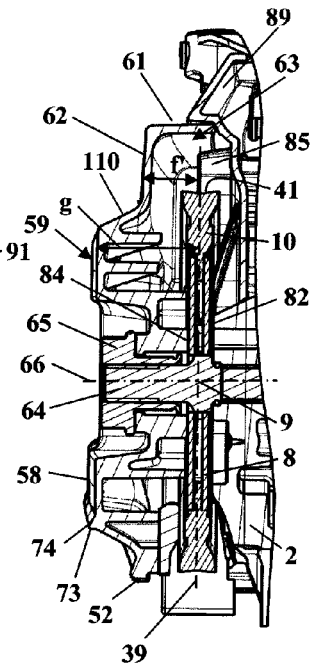
FIG. 15 shows a section along the line XV-XV in FIG. 7.

FIG. 15 shows a section through a fastening bolt 64 of the guide bar 8. The fastening bolt 64 here is the fastening bolt which is located closer to the drive element 17. Provision can also be made to fix the sprocket wheel cover 16 to the housing 2 by just one fastening bolt. The fastening bolt 64 has a longitudinal axis 66 which is oriented perpendicularly to the central plane 39. As FIG. 15 shows, the edge 74 is arranged on a lower longitudinal side 73 of the lower longitudinal rib 58. The lower longitudinal side 73 here is the longitudinal side of the lower longitudinal rib 58, which longitudinal side is located facing the longitudinal border 52. As FIG. 15 shows, the sprocket wheel cover 16 has a bearing surface 84 with which the sprocket wheel cover 16 rests on the guide bar 8. A bar stop surface 82, on which the guide bar 8 rests, is formed on the housing 2. A side plate can also be arranged between guide bar 8 and housing 2.

As FIG. 15 shows, the outer side 110 of the sprocket wheel cover surface 62 is at a distance f' from the central plane 39 in the section plane shown in FIG. 15. The distance f' can approximately correspond to the distance (f) shown in FIG. 14. The outer side 110 of the support surface 59 is at a distance (g), which is advantageously significantly larger than the distance (f), from the central plane 39. The distance (g) is advantageously at least 1.3 times the distance (f, f'). In order not to unnecessarily increase the overall width of the chain saw 1, the distance (g) is advantageously less than twice the distance (f, f'). As FIG. 15 also shows, the sprocket wheel space 47 adjacent to the roof 41 of the saw chain 10 forms a channel 63 which is bounded by the peripheral wall 61 and the sprocket wheel cover surface 62. The distance of the sprocket wheel cover surface 62 from the saw chain 10 is advantageously comparatively small in the channel 63. The distance from the peripheral wall 61 and from the conducting rib 85 is also advantageously as small as possible.

Figure 16:
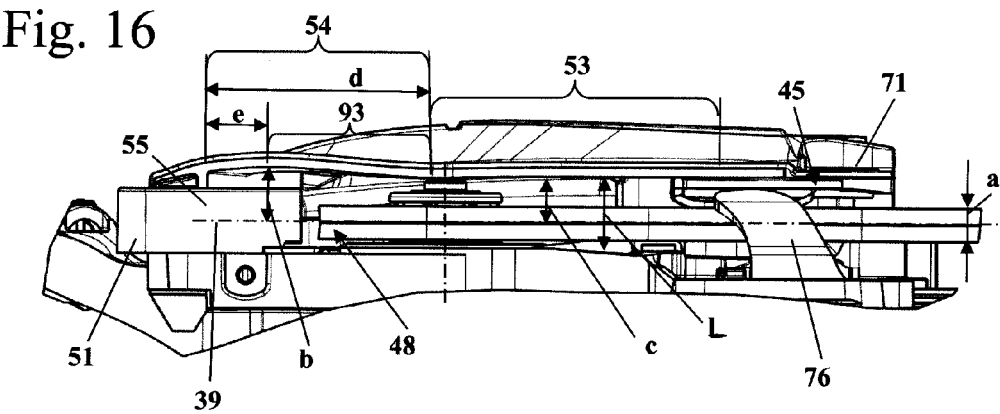
FIG. 16 shows a view from below in the direction of the arrow XVI in FIG. 7.

FIG. 16 shows the longitudinal border 52 in detail. The longitudinal border 52 is at a distance L, as measured perpendicularly to the central plane 39, from the housing 2 over at least 50%, in particular over at least 70%, of its length from the entry region 45 as far as the discharge opening 48. The distance L can vary here over the length of the longitudinal border 52. However, at each point between the entry region 45 and the discharge opening 48, the distance L corresponds at least to the chain width (a). As FIG. 16 shows, the distance between the longitudinal border 52 and the housing 2 is partially spanned at the entry region 45 by the chain catch 76. The chain catch 76 can also be arranged on the sprocket wheel cover 16 and can be arranged between the entry region 45 and the discharge opening 48. The distance L between sprocket wheel cover 16 and housing 2 corresponds at least to the chain width (a) over at least 50% of the length of the longitudinal border 52 from the entry region 45 as far as the discharge opening 48. The distance can be spanned in parts by elements, such as the chain catch 76 or sliding strips (77, 78).

As FIG. 16 shows, the longitudinal border 52 has a first region 53 which extends from the entry region 45 as far as the discharge opening 48. In the embodiment, the longitudinal border 52 runs parallel to the central plane 39 in the first region 53. The longitudinal border has a second region 54 which bounds the discharge opening 48 and extends between the first region 53 and the wall 55 of the guide part 51. The second region 54 has a length (d), as measured parallel to the central plane 39, which length is at least 3 times, in particular at least 5 times, the chain width (a). In the second region 54, the longitudinal border 52 runs in an arcuate manner with respect to the central plane 39 of the guide bar 8. The discharge opening 48 is the region which is bounded by the arcuate section of the longitudinal border 52 perpendicularly to the central plane 39. In a section 93, the longitudinal border 52 is at a distance from the central plane 39 in a curved manner. The longitudinal border 52 runs here inclined by a changing angle with respect to the central plane 39. Between the region 93 and the wall 55, the longitudinal border 52 runs in a curved manner in the direction of the central plane 39. The longitudinal border 52 is at its greatest distance (b) from the central plane 39 adjacent to the region 93 at a distance (e) from the wall 55. The distance (e) corresponds at least to half the chain width (a). In the embodiment, the distance (e) is greater than the chain width (a). In the first region 53, the longitudinal border 52 is at a distance (c) from the central plane 39. The distance (c) advantageously corresponds at least to the chain width (a). The distance (c) here is the smallest distance of the longitudinal border 52 from the central plane 39. The greatest distance (b) is advantageously at most 500% of the smallest distance (c). The smallest distance (c) is advantageously at most 1.5 times the chain width (a).

Figure 17:
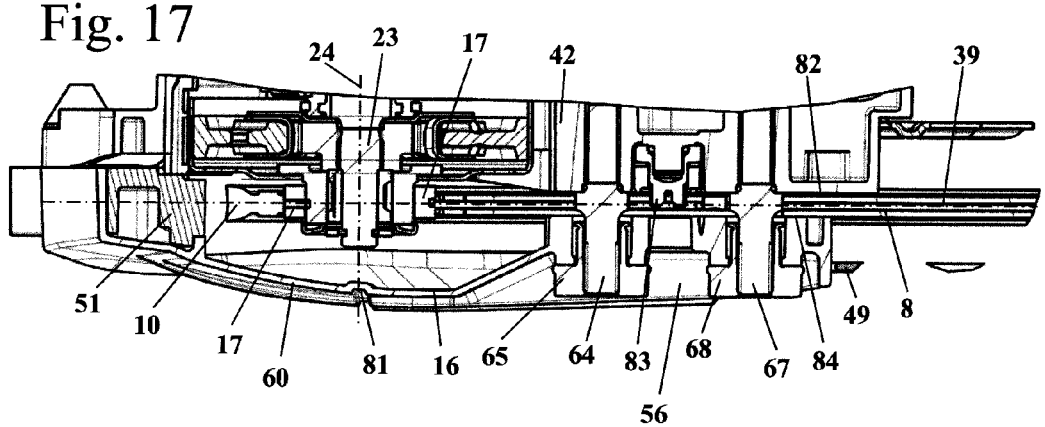
FIG. 17 shows a section along the line XVII-XVII in FIG. 7.

FIG. 17 shows a section through the longitudinal center axis 9 and the rotational axis 24 perpendicularly to the central plane 39. As FIG. 17 shows, a front fastening bolt 67, onto which the fastening nut 68 is screwed, is fixed to the housing part 42 on that side of the sprocket wheel cover 16 which faces the guide bar 8. The fastening nuts 65 and 68 are arranged in the recess 56. Only the fastening nut 68 projects slightly beyond the outer side of the sprocket wheel cover 16. The guide bar 8 is held clamped on the sprocket wheel cover 16 between the bar stop surface 82 and the bearing surface 84. An adjustment screw 83 with which the quantity of oil which is supplied to the saw chain 10 can be adjusted is provided on the housing part 42 between the fastening bolts 64 and 67. As FIG. 17 shows, the felling strip 81 is arranged in such a manner that it is intersected by the rotational axis 24 of the drive element 17. The connecting region 60 engages at a comparatively large distance over the end side of the crankshaft 23.

Figure 18:
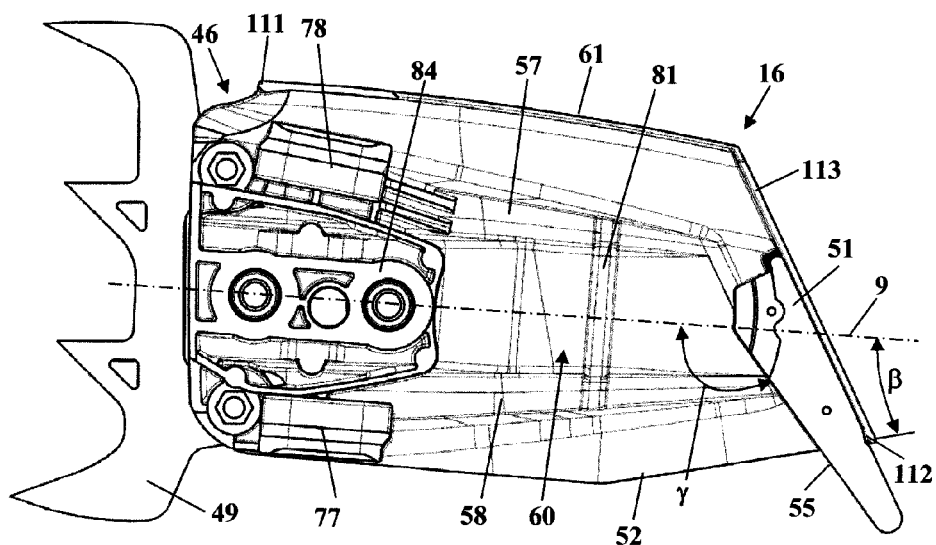
FIG. 18 shows a side view of the sprocket wheel cover from the side facing the housing of the chain saw.

FIG. 18 shows the sliding strips 77 and 78 on the sprocket wheel cover. As FIG. 18 also shows, the upper peripheral wall 61 has a thickening 111 on its end side bounding the exit opening 46. The sprocket wheel cover 16 has a rear wall 113 which lies facing away from the second clawed stop 49. The rear wall 113 has a thickening 112 adjacent to the longitudinal border 52. The thickenings 111 and 112 serve for increasing the stability of the sprocket wheel cover 16. The guide part 51 has a clearance in which the thickening 112 engages. As FIG. 18 also shows, the wall 55 of the guide part 51 encloses, with the longitudinal center axis 9 of the guide bar 8, an angle γ which is advantageously at least 110°, in particular at least 120°. In the embodiment, the angle γ is approximately 130°. The angle β between the lower longitudinal border 52 adjacent to the discharge opening 48 (FIG. 16) and the longitudinal center axis 9 is also shown in FIG. 18.

Figure 20:
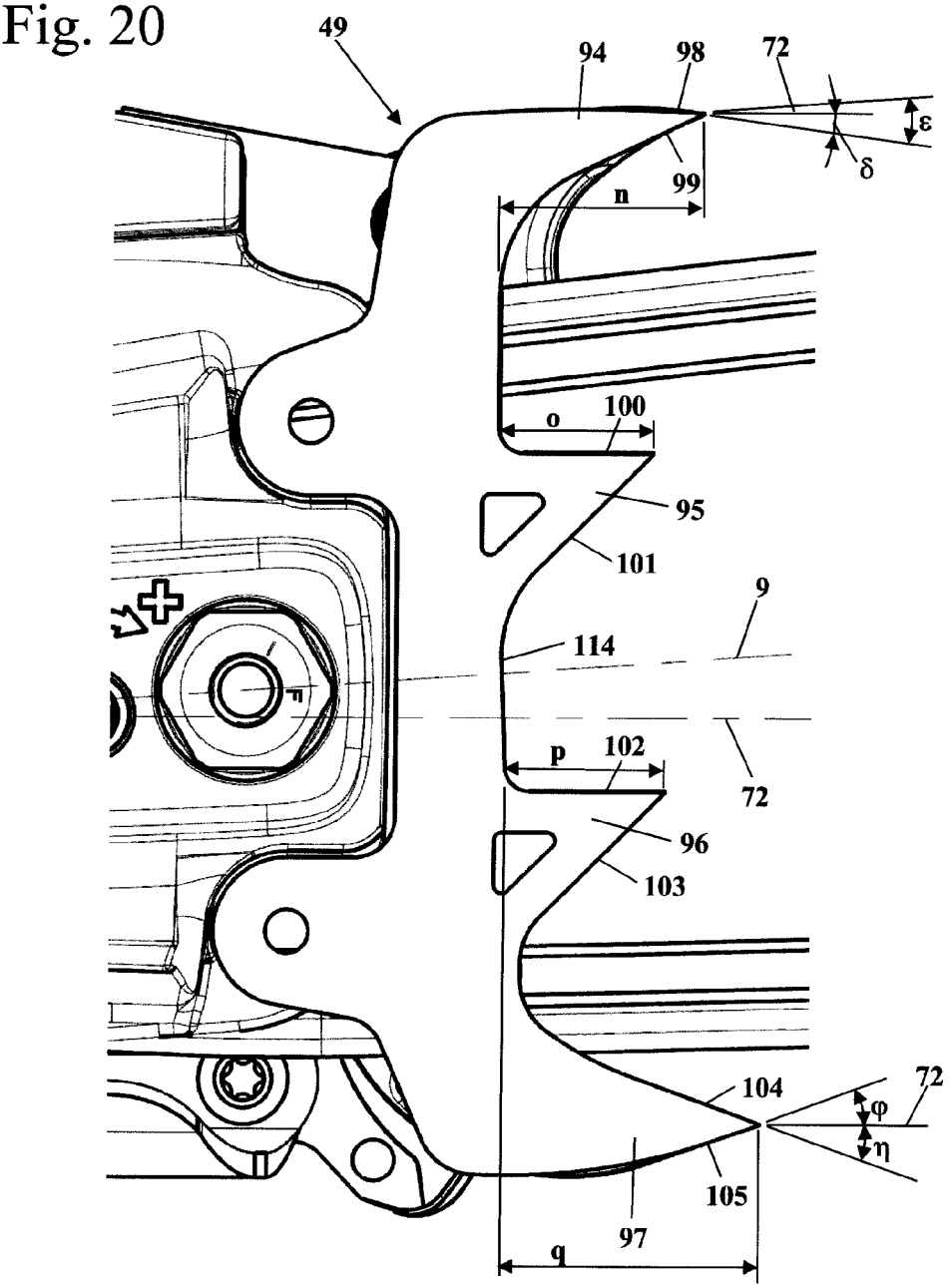

FIG. 20 shows the clawed stop 49 in detail. The clawed stop 49 has a first prong 94 which is arranged at the top in the rest position 106 (FIG. 1), a second prong 95 arranged therebelow, a third prong 96 arranged under the second prong 95 and a fourth prong 97 arranged under the third prong 96. The second prong 95 and the third prong 96 are configured here to be significantly shorter than the first prong 94 and the fourth prong 97. Between the second prong 95 and the third prong 96, the clawed stop 49 has a prong base 114 which, in the embodiment, runs perpendicularly to the horizontal 72. The first prong 94 has a length (n), as measured parallel to the horizontal 72 and as far as the prong base 114. The fourth prong 97 has a length (q), as measured parallel to the horizontal 72 and as far as the prong base 114, which length (q), in the embodiment, is greater than the length (n) of the first prong 94. The length (q) is advantageously approximately 75% to approximately 130% of the length (n). The second prong 95 has a length (o), as measured parallel to the horizontal 72 and as far as the prong base 114, which length (o) is significantly smaller than the length (n) and the length (q). The length (o) is advantageously less than 90% of the length (n). The third prong 96 has a length (p), as measured parallel to the horizontal 72 and as far as the prong base 114, which length (p) is advantageously significantly smaller than the length (n) and the length (q) and corresponds to the length (o). Owing to the fact that the two central prongs 95 and 96 are configured to be shorter than the outer prongs 94 and 97, good ergonomics are produced. When the clawed stop 49 is pivoted laterally, the outer prongs 94 and 97 can remain in engagement with a work piece significantly longer than the two central prongs 95 and 96.

The second prong 95 and the third prong 96 are advantageously configured to be identical or virtually identical and have a top side (100, 102) and a bottom side (101, 103). In the rest position 106 (FIG. 1), the top sides 100 and 102 run parallel to the horizontal 72. The top sides 100 and 102 can also run upward in an inclined manner in the rest position 106. The angle which the top sides 100 and 102 enclose with the horizontal 72 is advantageously up to a maximum of approximately 20°. The angle here can be identical for the two prongs 95 and 96. However, slightly different angles may also be advantageous. The bottom sides 101 and 103 are inclined by an acute angle with respect to the top sides 100 and 102. In the embodiment, the angle which the top sides (100, 102) enclose with the bottom sides (101, 103) is between 30° and 60°, preferably approximately 45°. The angle which the bottom sides (101, 103) enclose with the horizontal 72 can be identical here for the second prong 95 and the third prong 96. However, slightly different angles may also be advantageous. The first prong 94 has a top side 98 and a bottom side 99. The top side here is in each case the side facing upward in the rest position 106 and the bottom side is the side facing downward in the rest position 106. The top side 98 slopes downward to the free end of the first prong 94 adjacent to the point of the first prong 94 in the rest position 106. The first prong 98, adjacent to the point thereof, encloses, with the horizontal 72, an angle δ which is preferably more than 2°. The angle δ is preferably of approximately 2° to approximately 10°, in particular approximately 4° to 6°. The top side 98 encloses, with the bottom side 99, which runs upward with respect to the point of the first prong 94, an angle ϵ which is preferably of approximately 5° to approximately 40°.

The top side 104 of the prong 97 slopes downward toward the free end of the fourth prong 97 and encloses, with the horizontal 72, an angle η which is of approximately 10° to approximately 40°. The lower side 105 of the fourth prong 97 rises toward the point and encloses an angle φ with the horizontal 72. The angle φ can be approximately the same size as the angle η. The angle φ is preferably of approximately 10° to approximately 40°. The top side 104 of the fourth prong 97 encloses, with the bottom side 105, an angle which is significantly larger than the angle ϵ. As a result of the fact that the top side 98 of the first prong 94 slopes downward toward the point of the prong 94 in the rest position 106 and the bottom side of the fourth prong 97 rises toward the point of the prong 97 in the rest position 106, easy working is made possible.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:
a housing;
a guide bar defining a longitudinal center axis and being mounted on said housing;
a saw chain arranged on said guide bar so as to revolve therearound in a running direction;
a drive motor;
a drive element defining a rotational axis and being arranged between said drive motor and said saw chain;
said drive motor being configured to drive said saw chain in said running direction via said drive element;
said guide bar further defining an imaginary center plane containing said longitudinal center axis and extending perpendicularly to said rotational axis of said drive element;
said saw chain having a chain width (a) measured perpendicularly to said imaginary center plane;
said guide bar having a free end remote from said housing and having a redirect region at said free end;
said saw chain having a first side running from said redirect region to said drive element and a second side running in said running direction from said drive element to said redirect region;
a sprocket wheel cover delimiting a sprocket wheel space accommodating said drive element therein;
said sprocket wheel space being configured to provide an entry region to permit said saw chain to pass into said sprocket wheel space and being configured to provide a discharge opening for cut matter;
said sprocket wheel cover having a longitudinal edge delimiting said sprocket wheel space next to said first side of said saw chain;
said longitudinal edge extending over a predetermined length from said entry region to said discharge opening;
said longitudinal edge being at a distance (L) to said housing over at least 50% of said predetermined length with said distance (L) being measured perpendicularly to said imaginary center plane;
said distance (L) corresponding at least to said saw chain width (a);
said longitudinal edge of said sprocket wheel cover having a section at said discharge opening wherein said longitudinal edge runs inclined to said imaginary center plane of said guide bar and whereat said discharge opening widens in said running direction of said first side of said saw chain;
said longitudinal edge having a first location lying at a largest distance (b) to said imaginary center plane and a second location lying at a smallest distance (c) to said imaginary center plane; and,
said largest distance (b) to said imaginary center plane being at least 110% greater than said smallest distance (c) to said imaginary center plane.

2. The portable handheld work apparatus of claim 1, wherein said largest distance (b) is at most 500% of said smallest distance (c).

3. The portable handheld work apparatus of claim 1, wherein said smallest distance (c) of said longitudinal edge to said center plane is at most 1.5 times said saw chain width (a).

4. The portable handheld work apparatus of claim 1, wherein said longitudinal edge has a first region running parallel to said imaginary center plane and said discharge opening is delimited by a second region of said longitudinal edge with said second region running at least partially inclined to said imaginary center plane.

5. The portable handheld work apparatus of claim 1, wherein the length (d) of said discharge opening is at least 3 times said saw chain width (a) with said length (d) being measured in said center plane.

6. The portable handheld work apparatus of claim 1, wherein said apparatus further comprises a wall delimiting said discharge opening at the side lying facing away from said entry region; said longitudinal edge runs in an arc at said discharge opening; said longitudinal edge is at its greatest distance (b) to said center plane in a distance (e) to said wall; and, said distance (b) corresponds to at least half said saw chain width (a).

7. The portable handheld work apparatus of claim 1, wherein said apparatus further comprises a guide part including a wall having a side disposed facing away from said entry region; said discharge opening is delimited by said side of said wall; said side of said wall and said longitudinal center axis of said guide bar conjointly define an angle (γ) opening to said discharge opening; and, said angle (γ) is at least 110°.

8. The portable handheld work apparatus of claim 1, wherein said sprocket wheel cover has an inner wall; said inner wall and said imaginary center plane conjointly define an angle (α) at said discharge opening in a section plane perpendicular to said imaginary center plane and said longitudinal center axis; and, said angle (α) lies in a range of approximately 2° to approximately 45° and opens away from said sprocket wheel space.

9. The portable handheld work apparatus of claim 1, wherein said longitudinal edge at said discharge opening, when viewed in plan onto said plane of said guide bar, and said longitudinal center axis of said guide bar conjointly define an angle (β) which opens toward the running direction of the first side of said chain saw.

10. The portable handheld work apparatus of claim 1, wherein said sprocket wheel cover has a recess formed therein; said apparatus further comprises an attachment element arranged on the outer side of said sprocket wheel cover in said recess and being provided for attaching said sprocket wheel cover to said housing of said work apparatus; and, wherein said recess is delimited by upper and lower longitudinal ribs having respective outer sides conjointly defining a support surface of said sprocket wheel cover.

11. The portable handheld work apparatus of claim 10, wherein said sprocket wheel cover has an upper peripheral wall adjacent said second side of said chain saw; said sprocket wheel cover defines a sprocket wheel cover surface extending from said upper peripheral wall; and, said sprocket wheel cover surface is at a distance (f, f') from said imaginary center plane corresponding to less than twice said saw chain width (a).

12. The portable handheld work apparatus of claim 11, wherein said sprocket wheel space is further configured as a channel at said second side of said saw chain; said channel extends between said saw chain and said upper peripheral wall and is delimited at least partially by said sprocket wheel cover surface in a direction perpendicular to said imaginary center plane.

13. The portable handheld work apparatus of claim 11, wherein said support surface is disposed at a distance (g) from said imaginary center plane; said distance (f, f') of said outer side of said sprocket wheel cover to said imaginary center plane, when viewed in a section plane containing the rotational axis of said drive element and being perpendicular to said longitudinal center axis of said guide bar, is less than said distance (g) of said support surface to said imaginary center plane.

14. The portable handheld work apparatus of claim 13, wherein said distance (g) of said support surface to said imaginary center plane, when viewed in a section plane containing the longitudinal axis of said attachment element and perpendicular to said imaginary center plane, is at least 1.3 times said distance (f') of said outer side of said sprocket wheel cover to said imaginary center plane.

15. The portable handheld work apparatus of claim 11, wherein said apparatus further comprises a clawed stop; said sprocket wheel cover having at least one attachment opening and a bearing surface surrounding said attachment opening for accommodating said clawed stop thereon; and, said bearing surface being at a distance (h) from said imaginary center plane of at most twice said saw chain width (a).

16. The portable handheld work apparatus of claim 11, wherein said sprocket wheel cover has an area which covers said drive element; said upper and lower longitudinal ribs are mutually connected via a connecting region at said area; said connecting region has an outer surface disposed at a distance (h) to said imaginary center plane viewed in a section plane containing the rotational axis of said drive element and perpendicular to said longitudinal center axis of said guide bar; and, said distance (h) is at least 1.3 times said distance (f) of said outer side of said sprocket wheel cover surface to said imaginary center plane in said section plane.

17. The portable handheld work apparatus of claim 10, wherein said lower longitudinal rib has a longitudinal side facing toward said longitudinal edge; and, said sprocket wheel cover has a ridge at said longitudinal side of said lower longitudinal rib which rises from said support surface.

18. The portable handheld work apparatus of claim 17, wherein said ridge has an approximately wedge-shaped cross section; said ridge has an outer side; and, said outer side of said ridge and said support surface conjointly define an angle ($\sigma$) lying in a range from approximately 100° to approximately 178°.

19. The portable handheld work apparatus of claim 18, wherein said ridge has an elevation (r) measured perpendicularly to said support surface; and, said elevation (r) lies in a range of approximately 1 mm to approximately 5 mm.

* * * * *